(No Model.)

G. SANFORD.
MACHINE FOR OBTAINING FIBERS FROM FIBER BEARING PLANTS.

No. 306,180. Patented Oct. 7, 1884.

Witnesses:
Fred Haynes
Matthew Pollock

Inventor:
D. Gelston Sanford
by his Attorneys
Brown & Hall

UNITED STATES PATENT OFFICE.

GELSTON SANFORD, OF BROOKLYN, NEW YORK.

MACHINE FOR OBTAINING FIBERS FROM FIBER-BEARING PLANTS.

SPECIFICATION forming part of Letters Patent No. 306,180, dated October 7, 1884.

Application filed February 19, 1884. (No model.)

*To all whom it may concern:*

Be it known that I, GELSTON SANFORD, of Brooklyn, in the county of Kings and State of New York, have invented a new and useful Improvement in Machines for Obtaining Fibers from Fiber-Bearing Plants, of which the following is a specification.

My invention relates to machines in which the stalks, leaves, or other parts of fiber-bearing plants are subjected to a rubbing action between a stationary surface and a surface having a continuously-progressive motion, both surfaces being fluted, grooved, corrugated, or otherwise ribbed or roughened, so as to act effectively upon the plants subjected to them.

The invention consists, essentially, in the combination, with an upper rubbing-surface which is stationary, of a lower rubbing-surface formed by an endless flexible carriage or traveler, and in other combinations of parts hereinafter described, and referred to in the claims.

Figure 1:
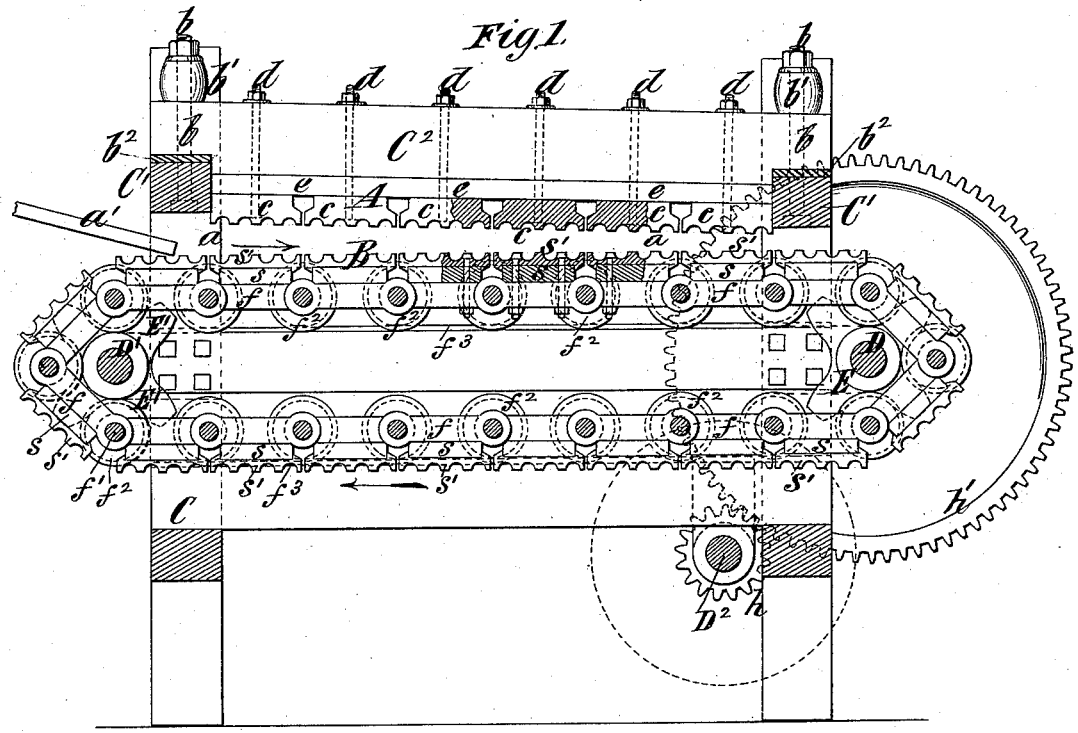
Figure 2:
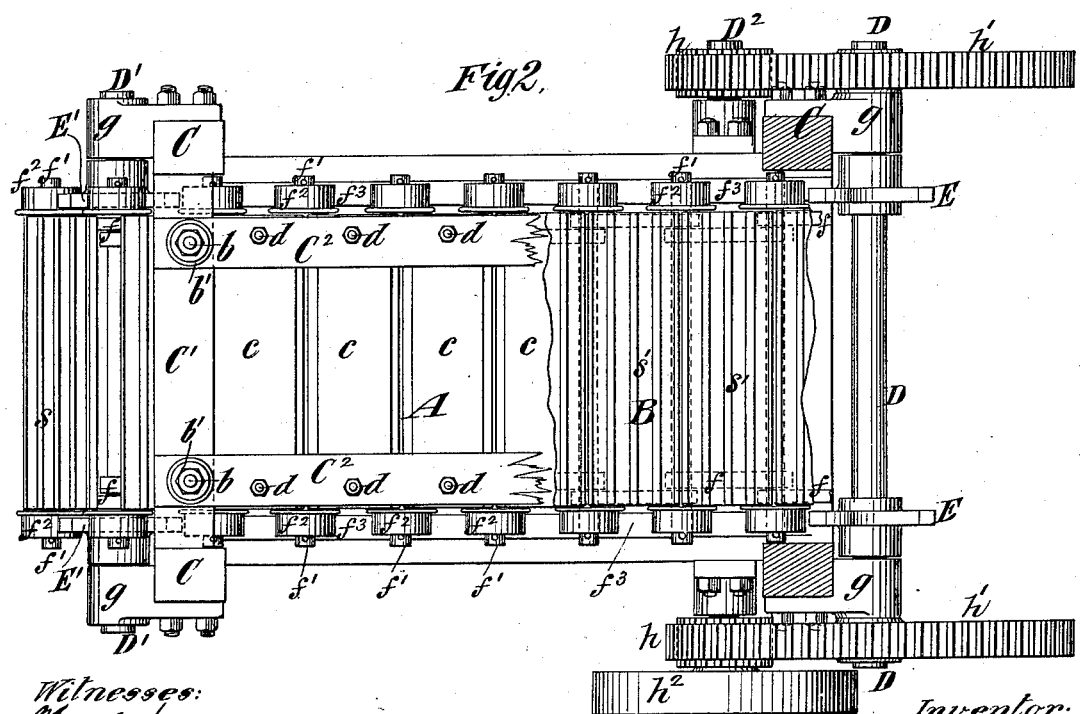

In the accompanying drawings, Figure 1 is a vertical longitudinal section of a machine embodying my invention, and Fig. 2 is a plan thereof, a portion of the upper rubbing-surface being removed in order to show more clearly the endless flexible carriage or traveler, and a portion of the said carriage or traveler also being removed.

Similar letters of reference designate corresponding parts in both figures.

A designates the upper stationary rubbing-surface. B designates the endless flexible carriage or traveler which constitutes the lower rubbing-surface, and which has a continuously-progressive movement. The two rubbing-surfaces are preferably so arranged and supported that the opening or space $a$ between them will be gradually contracted from one end toward and to the other end, as is shown in Fig. 1. At the larger or wider end of the space or opening $a$ is arranged a feed-board, $a'$, from which the materials to be operated on are fed in between the converging rubbing-surfaces A B, and at the end opposite the feed-board $a'$ the materials are delivered.

I will first describe in detail the construction of the parts which form the stationary rubbing-surface, and then will describe the construction of the endless flexible carriage or traveler which constitutes the movable rubbing-surface.

The frame-work C of the machine comprises transverse girths C', on which are placed longitudinal girths $C^2$, secured to the transverse girths C' by bolts $b$, and springs $b'$, of rubber or other material, are applied to these bolts in order to afford a yielding connection between the movable longitudinal girths $C^2$ and the transverse girths C'.

$c$ designates staves or pieces, which extend transversely across under the longitudinal girths $C^2$ and are secured to them by bolts $d$. The staves or pieces $c$ may be made of metal, wood, or other suitable material, and between them and the longitudinal girths $C^2$ is placed a packing, $e$, of rubber or other suitable material. The faces of the staves or pieces $c$ which constitute the stationary rubbing-surface are fluted, grooved, corrugated, or otherwise ribbed or roughened, so as to form an effective surface for acting on the materials passing through the space or opening $a$.

From the above description it will be clear that each of the staves or pieces $c$ is capable of yielding independently of the others by reason of the packing $e$, and that the upper rubbing-surface is capable of yielding bodily by reason of the springs $b'$.

The extent to which the upper rubbing-surface, as a whole, will yield can be varied by tightening or loosening the nuts of the bolts $b$, and by slackening the said nuts and introducing packing-pieces $b^2$ under the longitudinal girths $C^2$, as shown in Fig. 1, the upper rubbing-surface may be adjusted upward, and the space or opening $a$ will thus be widened or made of greater depth.

The endless flexible carriage or traveler consists, essentially, of two endless chains, $f f$, composed of links connected by pins $f'$, and on the end of these pins $f'$ are rollers $f^2$, which run on bearers $f^3$ secured to the frame C. To the chains are secured transversely-extending staves or pieces S, which are bolted to the chains.

At one end of the machine is a shaft, D, on which are secured chain or sprocket wheels E, which take into and drive the chains, and at the opposite end of the machine is an idler-shaft, D', and idler chain-wheels E', around which the chains pass. The shafts D D' are mounted in suitable bearings, g, attached to the frame C of the machine.

D² designates a driving-shaft extending parallel with the shaft D and geared therewith by pinions h and wheels h'.

On the driving-shaft D² is a pulley, h², for a driving-belt, and by the mechanism described a continuously-progressive motion is imparted to the endless carriage or traveler in the direction indicated by the arrows, Fig. 1.

As here shown, the transversely-extending staves or pieces S have facing-pieces S', of metal; but the staves may be made of single pieces of wood, metal, or other material. The facing-pieces S' are shown as grooved or fluted, like the staves c of the upper stationary rubbing-surface, A.

Obviously the endless carriage or traveler may be made as long as desired by simply increasing the length of the chains f f, and a machine having rubbing-surfaces A B of great extent can thus be obtained at a comparatively small cost.

For operating on materials of a resinous or gummy nature it may be desirable to use water, and in such case a pipe may be arranged to deliver water above the upper stationary rubbing-surface, A. This water will trickle down between the staves or pieces c, and will wash the materials while passing through the machine.

What I claim as my invention, and desire to secure by Letters Patent, is—

1. In a machine for obtaining fibers, the combination of an upper stationary rubbing-surface, and a lower rubbing-surface consisting of an endless flexible carriage or traveler, substantially as herein described.

2. In a machine for obtaining fibers, the combination of an upper stationary rubbing-surface, and a lower rubbing-surface consisting of an endless flexible carriage or traveler, the two being so arranged as to form between them a space or opening, a, tapering or gradually contracted from one end to the other of the machine, substantially as and for the purpose herein described.

3. In a machine for obtaining fibers, the combination of an upper stationary rubbing-surface capable of yielding upwardly, and a lower rubbing-surface consisting of an endless flexible carriage or traveler, substantially as herein described.

4. In a machine for obtaining fibers, the combination of an upper stationary rubbing-surface having staves which extend transversely to its length and are capable of yielding independently of each other, and a lower rubbing-surface consisting of an endless flexible carriage or traveler, substantially as herein described.

5. In a machine for obtaining fibers, the combination, with the frame C, having the fixed transverse girths C', of the longitudinal girths C², capable of yielding upwardly, staves c, extending between and secured to said longitudinal girths C², packing e between said staves and longitudinal girths, and a lower rubbing-surface consisting of an endless flexible carriage or traveler, substantially as herein described.

6. In a machine for obtaining fibers, the combination, with an upper stationary rubbing-surface, of a lower rubbing-surface consisting of the chains f f f', and staves or pieces S, extending between and secured to said chains, the whole forming an endless flexible carriage or traveler, substantially as herein described.

GELSTON SANFORD.

Witnesses:
FREDK. HAYNES,
HARRY BOGERT.